United States Patent [19]
Wilson et al.

[11] 3,901,136
[45] Aug. 26, 1975

[54] DISPLAY OVEN

[75] Inventors: Robert Gary Wilson, 10 Chisolm Trl., Greenville, S.C. 29607; Raymond W. Rogers; Anthony George Willien, both of Greenville, S.C.

[73] Assignee: said Robert G. Wilson by said Raymond W. Rogers and Anthony George Willien

[22] Filed: Jan. 28, 1974

[21] Appl. No.: 437,341

[52] U.S. Cl. .................. 99/352; 99/421 P; 99/446; 99/479
[51] Int. Cl. ............................................. A47j 37/04
[58] Field of Search .................... 99/419, 339–340, 99/420–421, 427, 443, 446–447, 352; 219/396; 242/77.2, 96, 115, 118.6; 287/52.04, 52.07

[56] References Cited
UNITED STATES PATENTS

| | | | |
|---|---|---|---|
| 215,609 | 5/1879 | Hanford | 242/115 |
| 382,091 | 5/1888 | Kelsea | 242/115 |
| 2,798,930 | 7/1957 | Frost | 99/339 UX |
| 3,090,294 | 5/1963 | Rodman | 99/339 X |
| 3,160,362 | 12/1964 | Weber | 242/118.6 X |
| 3,273,489 | 9/1966 | Wilson | 99/446 X |
| 3,361,055 | 1/1968 | Hondroulis | 99/421 HV |
| 3,633,491 | 1/1972 | Williams | 99/421 H X |
| 3,706,272 | 12/1972 | Wilson | 99/340 |

*Primary Examiner*—Harvey C. Hornsby
*Assistant Examiner*—Arthur O. Henderson
*Attorney, Agent, or Firm*—Bailey & Dority

[57] ABSTRACT

A display oven for cooking edibles on spits, skewers and the like is illustrated having a glass extension, projecting forwardly of an insulated housing, carrying partially therein a rotatable edible carrier assembly having a telescoping central shaft permitting ready removal of the edible carrier assembly, and flavoring means including a metallic housing having a rear wall suspended in heat transfer relation from a heating element carried within the housing with downwardly and inwardly inclined resilient means pressing a hickory chip and the like against the rear wall causing the hickory chip to smoke for flavoring the edibles within the oven.

4 Claims, 6 Drawing Figures

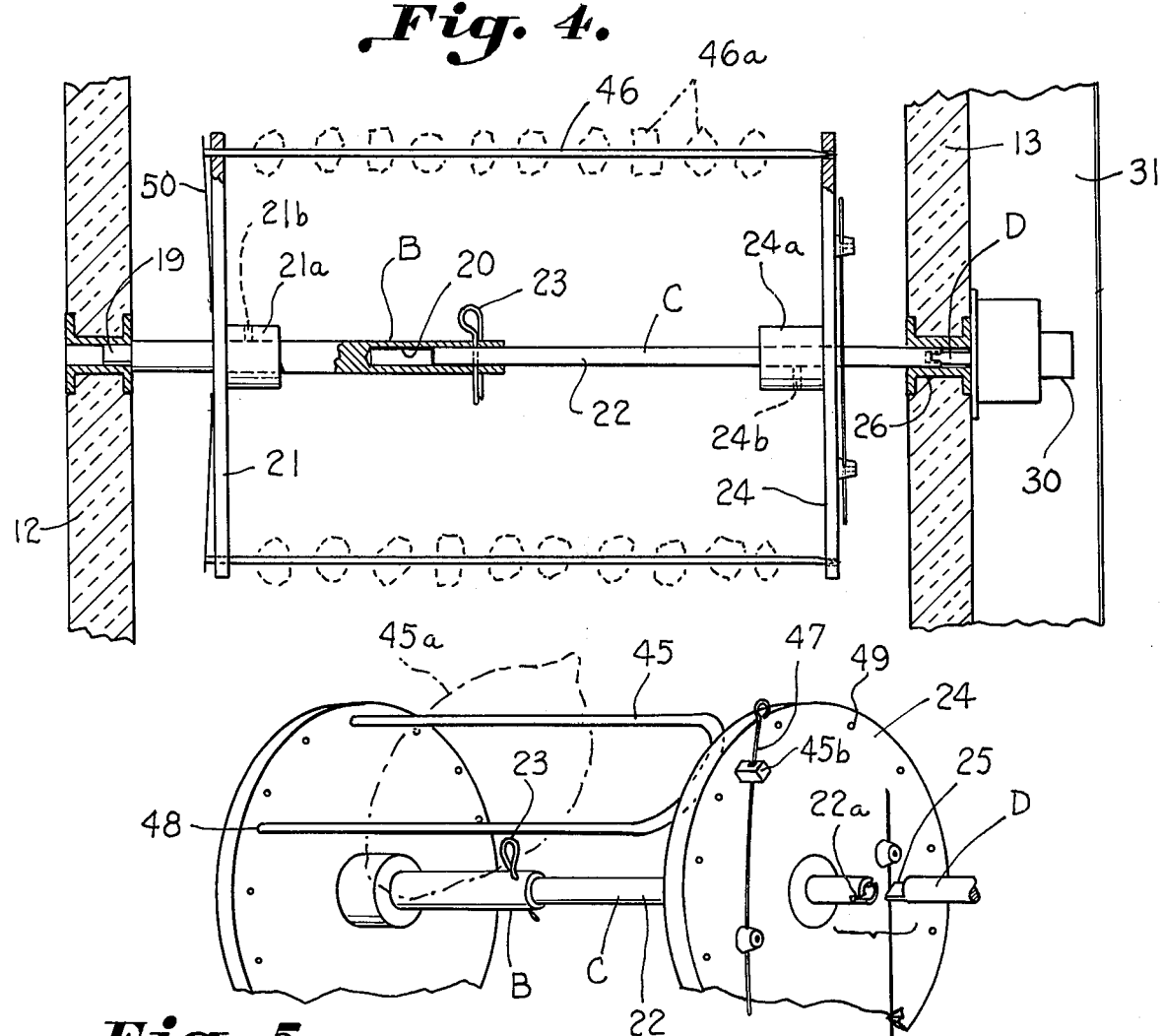
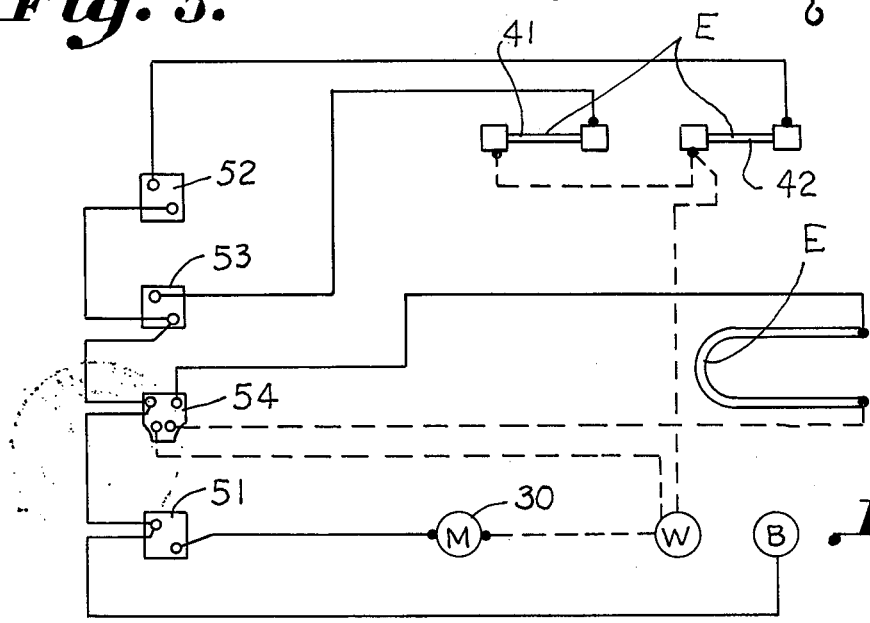

DISPLAY OVEN

This invention relates to a display oven especially adapted for cooking shisk kabobs and the like wherein the cooking takes place partially within a glass extension which projects forwardly of an insulated oven and which includes means facilitating the removal of the spit carrying assembly for cleaning while positioning flavoring means within the housing operable responsive to the heating elements carried therein. The glass extension of the oven permits the edibles to move from a relatively low heat zone therein to a high heat zone within the insulated housing avoiding burning of the edibles but permitting cooking throughout and browning while allowing customers to see the edibles cooking, thus promoting sales.

BACKGROUND OF THE INVENTION

Ovens for barbecuing and otherwise cooking edibles on spits carried by a rotatable edible carrier assembly have long been used and are typlified by ovens illustrated in U.S. Pat. Nos. 2,722,882 and 3,355,573. Such devices have afforded limited visibility to the edibles being cooked. While attempts have been made to facilitate cleaning of the ovens such as illustrated in U.S. Pat. Nos. 3,649,812 and 3,706,272, such is difficult when the devices are in home use or in use upon the counter of restaurants and the like. Means for causing wood chips and the like to smolder producing smoke for flavoring the meats being cooked have been provided but generally in the form of minaturized separate heating means for producing the smoke such as in U.S. Pat. No. 2,722,882.

Accordingly, it is an important object of the invention to provide a display oven especially for home use and for use adjacent restaurant counters and the like wherein visual perception of the edibles being cooked is maximized while at the same time permitting a uniform cooking with browning without burning of the edibles.

Another important object of the invention is to facilitate the flavoring of the meat through hickory smoke and the like utilizing the regular heating elements within the oven rather than special minaturized heating elements thus reducing the cost of the device.

Another important object of the invention is to facilitate removal of the rotatable edible carrier assembly by providing a telescopically mounted shaft permitting easy removal of the assembly from the oven for cleaning of the assembly and the interior walls of the oven.

BRIEF DESCRIPTION OF THE INVENTION

It has been found that a display oven may be provided wherein a glass enclosed extension projects forwardly from an insulated oven permitting the edibles to move from a relatively low heat zone to a relatively high heat zone adjacent heating elements carried within an insulated housing while providing a rotatable edible carrier assembly wherein the spit supports may be telescoped toward one another facilitating removal thereof for cleaning and providing flavoring means which emits smoke produced by utilizing the electrical cooking elements provided for heating the oven.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 4 is an enlarged front elevation, with parts in section, illustrating the edible carrier assembly constructed in accordance with the invention.

FIG. 5 is a perspective view further illustrating the rotatable edible carrier assembly constructed in accordance with the present invention, and FIG. 6 is a circuit diagram illustrating the various electrical components utilized in the embodiment of the invention illustrated.

DESCRIPTION OF A PREFERRED EMBODIMENT

Figure 1:
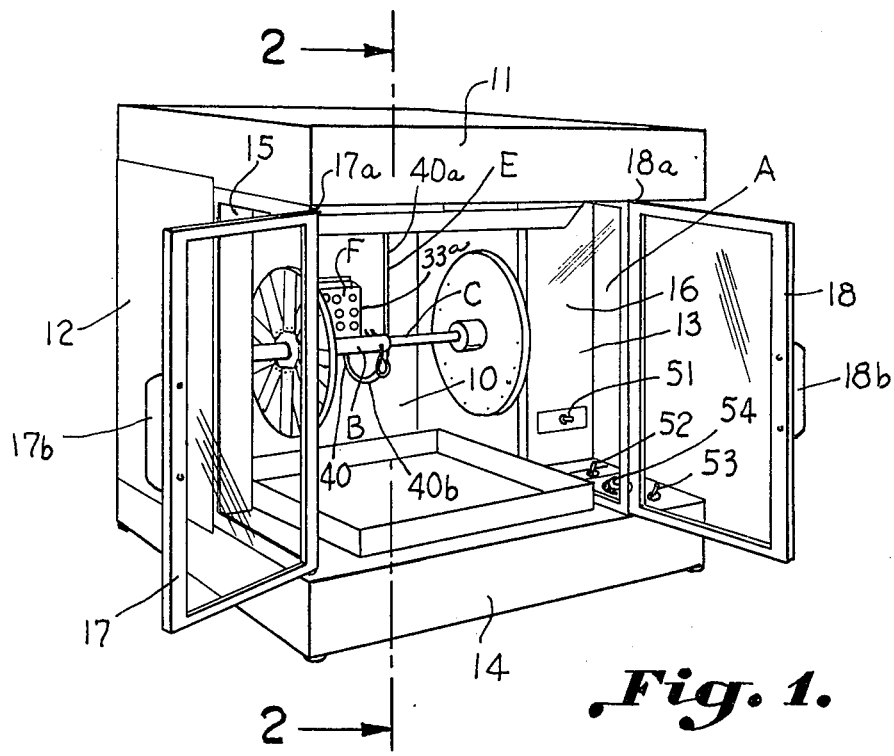
FIG. 1 is a perspective view illustrating a display oven constructed in accordance with the present invention.
Figure 3:
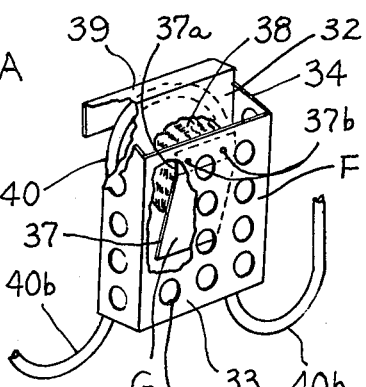
FIG. 3 is an enlarged perspective view illustrating means for flavoring the edibles utilizing heat from the electrical heating elements provided for heating the oven.
Figure 2:
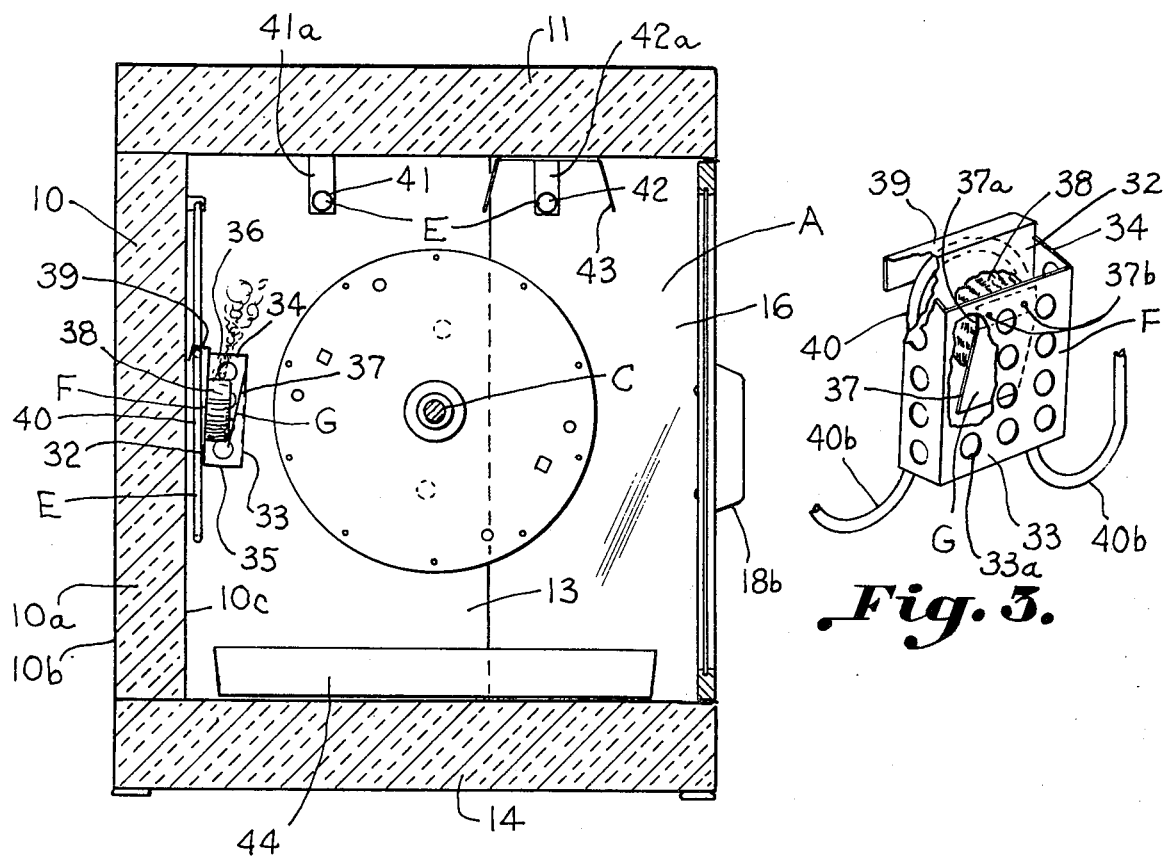
FIG. 2 is a longitudinal, sectional elevation taken on line 2—2 in FIG. 1.

The drawings illustrate a display oven for cooking edibles on spits, skewers and the like having a housing including insulated rear, top and side walls carried by a base. Glass extensions A project forwardly from the top and side walls and are carried by said base. Glass closure means extend across free ends of the glass extensions. A horizontal rotatable edible carrier assembly mounted for rotation between the insulated side walls has a central shaft connected, including a receiving portion B and an insertable portion C telescopically received within the receiving portion, connected to a driven stub shaft D on one end thereof extending across the oven. A portion of the edible carrier assembly extends between the glass extensions. Electrical heating means E are carried in the housing adjacent the insulated walls remote from the glass extensions forming a high heat zone in the housing and a lower heat zone within the glass extensions. Thus, the edibles are displayed within the glass extensions while cooking, and uniform heating and browning without burning of the edibles is provided while facilitating removal of the edible carrier assembly for cleaning. An open metallic housing F, suspended from an electrical heating means, has a rear wall and permits a flow of air therethrough. A downwardly and inwardly inclined resilient means G is carried by the housing receiving a hickory chip and the like urging same into engagement with the rear walls for heat transfer therefrom causing smoke to be emitted for flavoring the edibles.

The insulated housing includes an insulated rear wall 10 as may be provided by sandwiching fiber glass 10a between outer and inner sheetmetal layers 10b and 10c, respectively. A similar top wall 11 and side walls 12 and 13 are carried by a base member 14. The insulated housing thus formed has glass extensions A projecting forwardly from the top and side walls also carried by the base. The glass extensions A include side walls 15 and 16 which are carried between the top 11 and the base 14. Glass closure means in the form of glass doors 17 and 18 are hinged adjacent respective glass walls 15 and 16 as at 17a and 18a permitting closing of the open end of the oven defined by the free forward edges of the extensions A. Suitable handles 17b and 18b are provided. The glass doors are illustrated as having frame members but the doors may be constructed entirely of glass.

The horizontal edible carrier assembly has a central shaft telescopically carried within the oven and includes a receiving portion B and an insertable portion C. The receiving portion B is journaled as at 19 within the oven wall 12 and has an open bore 20 at the opposite end thereof. A radial spit or skewer carrying member 21 has a hub 21a secured to the receiving portion as by a set screw 21b. The insertable portion C consists of a shaft 22 having a reduced diameter for insertion within the bore 20 and which may be locked in place during use as by a cotter pin 23 which extends through aligned openings (not shown) within the receiving portion B and the insertable portion C. The opposed radially extending spit carrying member 24 has a hub 24a which is fixed as by a set screw 24b upon the shaft 22. The shaft 22 has a slotted end as illustrated at 22a in FIG. 5 which is adapted to receive a flat extension 25 of the driven stub shaft D to provide a driving connection between the driving means described below and the rotatable edible carrier assembly. The shaft 22 as well as the adjacent end of the stub shaft D are journaled in the wall 13 as in the bearing 26 carried within the wall. The stub shaft D is rotated by a suitable motor 30 of which the stub shaft D is a power takeoff. It will be noted that the motor 30 is carried within a housing 31 carried on the outside of the oven wall 13.

An open metallic housing F has a rear wall 32 which is opposite a perforate front wall 33 which has a series of openings 33a therein. The housing F has an open top as illustrated at 34 permitting smoke to be emitted therefrom. The rear and front walls are bridged as by a bottom 35 and perforate sides 36. Resilient means are provided in the form of a downwardly and inwardly inclined leaf spring 37 for positioning a hickory chip and the like 38. The downwardly inclined resilient means G includes the leaf spring 37 which extends outwardly of an upper part in 37a which receives rivets 37b for fixing the spring with respect to the housing. It will be observed that the housing carries a rearwardly extending bracket 39 which passes over an inverted U-shaped portion 40 of electrical heating means E which includes a calrod unit defined by the inverted U-shaped portion which includes upstanding legs 40a which are joined to the U-shaped portion as at 40b.

Additional heating means E include infrared heating elements 41 and 42. It will be observed that a reflector shield 43 is provided adjacent the heating element 42 which is suspended from the top 11 as at 42a so as to project the heat therefrom downwardly against the edibles. The infrared unit 41 is suspended also from the top 11 as at 41a. A pan 44 is provided to catch drippings from the edibles which are carried as by spits 45 or skewers 46. The edibles are illustrated in broken lines as in the form of chickens 45a or shish kabob 46a. The spits 45 may have rectangular end portions as illustrated at 45b for receiving a spring 47 for securing the adjacent end of the spits within the respective radially extending spit carrying member 24. The opposite ends of the spits extend into circumferentially spaced openings 48. The skewers 46 have a sharpened end receivable in circumferentially spaced openings 49 while the opposite ends project through the openings 48 and are secured in position as by leaf springs 50.

Referring now to FIGS. 1 and 6, switch means 51 is provided for activating the motor for driving the rotatable edible carrier assembly. Switch means 52 and 53 are provided for controlling the calrod and infrared heating elements while the thermostat 54 is provided for varying the temperatures of these elements. The infra red heating elements provide a penetrating heat tending to cook the edibles from the inside out while the calrod element is best for browning.

While a preferred embodiment of the invention has been described using specific terms, such description is for illustrative purposes only, and it is to be understood that changes and variations may be made without departing from the spirit or scope of the following claims.

What is claimed is:

1. A display oven for cooking edibles on spits, skewers and the like comprising:

a housing including insulated rear, top and side walls carried by a base;

glass extensions projecting forwardly from said side walls between said top and said base;

glass closure means across free ends of said glass extensions projecting from said walls;

a horizontal rotatable edible carrier assembly mounted for rotation between said insulated side walls;

a portion of said edible carrier assembly extending between said glass extensions projecting from said walls;

electrical heating means carried in said housing adjacent said insulated walls remote from said glass extensions forming a high heat zone in said housing and a lower heat zone within said glass extensions; and a motor for rotating said edible carrier assembly moving edibles alternately from a direct exposure to said heating means in said high heat zone to said lower heat zone remote from said heating means;

whereby the edibles are displayed within said glass extensions while cooking, and uniform heating and browning without burning of the edibles is facilitated.

2. An edible carrier assembly for positioning spits, skewers and the like with edibles thereon for rotation while cooking within an oven having opposed insulated vertical wall portions comprising:

a rotatably driven stub shaft extending horizontally adjacent an opening in a vertical wall portion accommodating said stub shaft;

a central shaft connected to said stub shaft on one end thereof extending across said oven toward the other vertical wall portion;

means carried by said other vertical wall portion receiving said central shaft on the other end thereof for rotation;

a radially extending support carried transversely of said central shaft adjacent each end thereof carrying said spits, skewers and the like therebetween in circumferentially spaced alignment with said central shaft;

said central shaft including a receiving portion and insertable portion telescopically received within said receiving portion between said radially extending supports; and means limiting further insertion of said insertable portion within said receiving portion during cooking but permitting telescoping of the central shaft after cooking;

whereby removal of the entire assembly is permitted to facilitate cleaning.

3. For use in an oven for cooking edibles carried for rotation therein on an edible carrier assembly, said oven having an insulated housing and an electrical heating element carried adjacent a wall of the housing for cooking said edibles, a holder for carrying flavoring material including a hickory chip and the like comprising:

an open metallic housing receiving a flow of air therethrough; said housing having a rear wall means suspending said metallic housing upon said heating element with said rear wall in heat transfer relation thereto; and a downwardly and inwardly inclined resilient means carried by said metallic housing receiving said hickory chip and urging same into engagement with said rear wall;

whereby heat is transferred from said rear wall to said hickory chip causing same to smolder emitting smoke into the oven as a result of the flow of air through the housing for flavoring the cooking edibles.

4. A display oven for cooking edibles on spits, skewers and the like comprising:

a housing including insulated rear, top and side walls carried by a base;

glass extensions projecting forwardly from said side walls between said top and said base;

glass closure means across free ends of said glass extension;

a horizontal rotatable edible carrier assembly mounted for rotation between the insulated side walls including a central shaft having a receiving portion and an insertable portion telescopically received within the receiving portion, connected to a driven stub shaft on one end thereof extending across the oven;

a portion of said edible carrier assembly extending between the glass extensions;

electrical heating means carried in said housing adjacent the insulated walls remote from the glass extensions forming a high heat zone in the housing and a lower heat zone within the glass extensions;

an open metallic housing suspended from an electrical heating means having a rear wall and permits a flow of air therethrough; and a downwardly and inwardly inclined resilient means carried by the housing receiving a hickory chip and the like and urging same into engagement with the rear wall causing smoke to be emitted for flavoring the edibles;

whereby the edibles are displayed within said glass extensions while cooking, and uniform heating, browning and flavoring without burning of the edibles is provided while facilitating removal of the edible carrier assembly for cleaning.

* * * * *